(12) United States Patent
Novak

(10) Patent No.: US 6,811,003 B2
(45) Date of Patent: Nov. 2, 2004

(54) WHEEL MOUNTING

(75) Inventor: David A. Novak, Clinton, OH (US)

(73) Assignee: The Tinken Company, Canton, OH (US)

( * ) Notice: Subject to any disclaimer, the term of this patent is extended or adjusted under 35 U.S.C. 154(b) by 114 days.

(21) Appl. No.: 10/085,398

(22) Filed: Feb. 28, 2002

(65) Prior Publication Data

US 2003/0159894 A1 Aug. 28, 2003

(51) Int. Cl.$^7$ ............................................. F16D 55/08
(52) U.S. Cl. ................... 188/72.1; 301/105.1; 384/505; 384/544; 464/906
(58) Field of Search .............................. 188/18 A, 72.1, 188/73.1; 301/105.1, 124.1, 126, 131; 384/499, 504–506, 543, 544, 589; 464/178, 182, 906

(56) References Cited

U.S. PATENT DOCUMENTS

| | | | |
|---|---|---|---|
| 3,379,290 A | | 4/1968 | Hamilton |
| 3,772,549 A | * | 11/1973 | Cumming .................... 310/168 |
| 4,132,293 A | * | 1/1979 | Jovick ...................... 188/181 R |
| 4,437,536 A | * | 3/1984 | Colanzi et al. .............. 180/254 |
| 4,761,018 A | * | 8/1988 | Abbruzzi et al. ...... 280/124.145 |
| 4,786,115 A | | 11/1988 | Ashberg .................... 301/124.1 |
| 4,854,423 A | | 8/1989 | Evans et al. |
| 5,715,916 A | | 2/1998 | Fanelli et al. |
| 6,196,727 B1 | * | 3/2001 | Kawamura ................... 384/544 |
| 2001/0019223 A1 | * | 9/2001 | Kaneko .................... 301/105.1 |

FOREIGN PATENT DOCUMENTS

| | | |
|---|---|---|
| FR | 2695094 A1 | 2/1992 |
| GB | WO 98/58762 | * 12/1998 |

OTHER PUBLICATIONS

Nui Wang, "The Design and Development of a Light Weight Small Bore Caliper and a Drum–in Disc Parkbrake", SAE Technical Paper Series, Feb. 24–29, 1992.

* cited by examiner

Primary Examiner—Pam Rodriguez
(74) Attorney, Agent, or Firm—Polster, Lieder, Woodruff & Lucchesi

(57) ABSTRACT

A mounting for a road wheel of an automotive vehicle includes a cast housing having a radial portion and a sleeve-like axial portion that projects beyond the front and back faces of the radial portion. The mounting also includes a hub having a shaft that extends into the axial portion of the housing and a flange located outside the housing where it is offset axially from the front face of the radial portion. The hub rotates in a bearing that is around its shaft and within the axial portion of the housing. A brake rotor is attached to the hub flange, and it includes a drum and a disk extended outwardly from the drum. A park brake is within the drum, and it includes at least one arcuate shoe curved around the axial portion of the housing. A service brake is mounted on the radial portion, and it has pads which clamp down on the disk of the brake rotor. The axial portion of the housing contains a sensor which monitors a target wheel in the bearing and produces a signal that reflects the angular velocity of the hub. The sensor lies remote from the park brake and is accessible from the back of the housing.

21 Claims, 5 Drawing Sheets

WHEEL MOUNTING

CROSS REFERENCE TO RELATED APPLICATIONS

Statement Regarding Federally Sponsored Research or Development

BACKGROUND OF THE INVENTION

This invention relates in general mountings for the road wheels of automotive vehicles and, more particularly, to a mounting that incorporates a drum brake and a disk brake.

Many automobiles of current manufacture have disk brakes at all four wheels. These brakes function well as service brakes for stopping vehicles or retarding their motion and are preferred over drum brakes in that respect. But they are not effective as park brakes. Automobiles with disk brakes at all four wheels also have drum brakes at their rear wheels to serve as park brakes.

The typical rear wheel mounting (FIGS. 6 & 7) that contains both disk and drum brakes has a hub provided with a flange and a spindle or shaft which projects from the flange into a housing and rotates on a bearing contained within the housing. The housing has a flange along which it is secured against a suspension upright or some other structure on which both the disk and drum brakes are mounted. Both brakes operate against a brake rotor that is attached to the flange of the hub along with the road wheel. The brake rotor of course has a disk and also a drum, with the disk projecting radially from the drum and producing a "drum-in-hat" configuration. The housing in which the hub rotates and particularly its flange leave little room for the drum brake. Indeed, to accommodate the drum brake the housing must be reduced to a minimal size and the bearing within it as well.

Many of these vehicles also have antilock braking systems and some even have traction control systems. These systems monitor the rotation of the vehicle wheels to distribute the braking effort between the wheels in a manner which retards uncontrolled skids and transfers the engine torque to the driven wheel which has the best traction. In a system in common use (FIG. 6), a probe projects through the housing of the hub assembly to monitor the rotation of the hub. The probe emerges from the housing within the confines of the brake drum and at the drum brake, making the interior of the hub all the more confining and the routing of the electrical probe cable difficult.

SUMMARY OF THE INVENTION

The present invention resides in a mounting for a road wheel, and that mounting includes a one-piece housing having a radial portion and an axial portion. The mounting also includes a hub having a shaft that extends into the axial portion of the housing and a flange located outside the housing and offset axially from the radial and axial portions. In addition, the mounting includes a bearing between the axial portion of the housing and the shaft of the hub. The mounting may also include a brake that is mounted on the housing and has an arcuate shoe that curves around the axial portion of the housing. The invention further resides in the housing itself.

BRIEF DESCRIPTION OF THE SEVERAL VIEWS OF THE DRAWINGS

Corresponding reference characters indicate corresponding parts throughout the several views of the drawings.

DETAILED DESCRIPTION OF INVENTION

Figure 1:
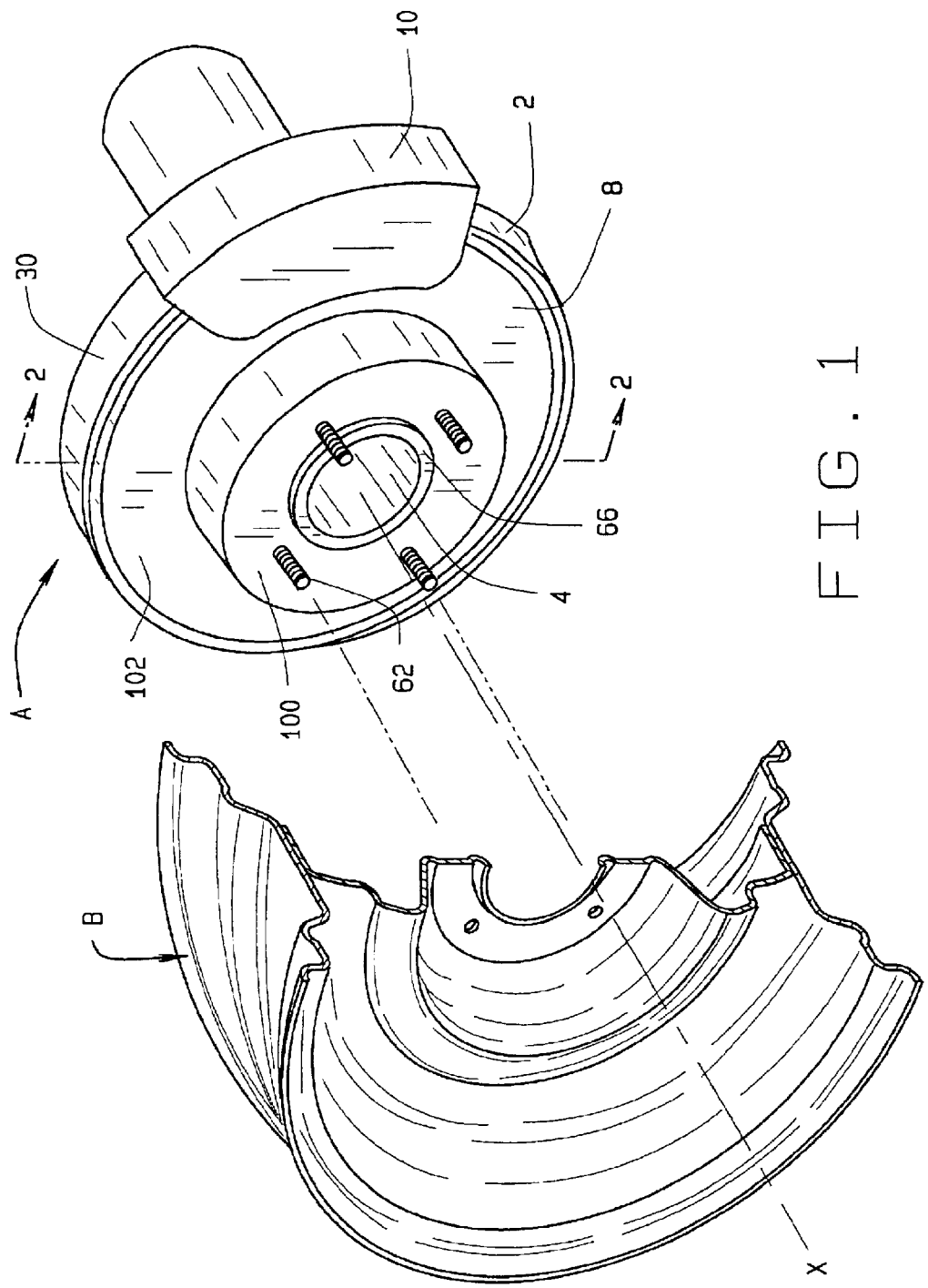
FIG. 1 is a perspective view of a wheel mounting, constructed in accordance with and embodying the present invention, and at of a wheel detached from the mounting.
Figure 3:
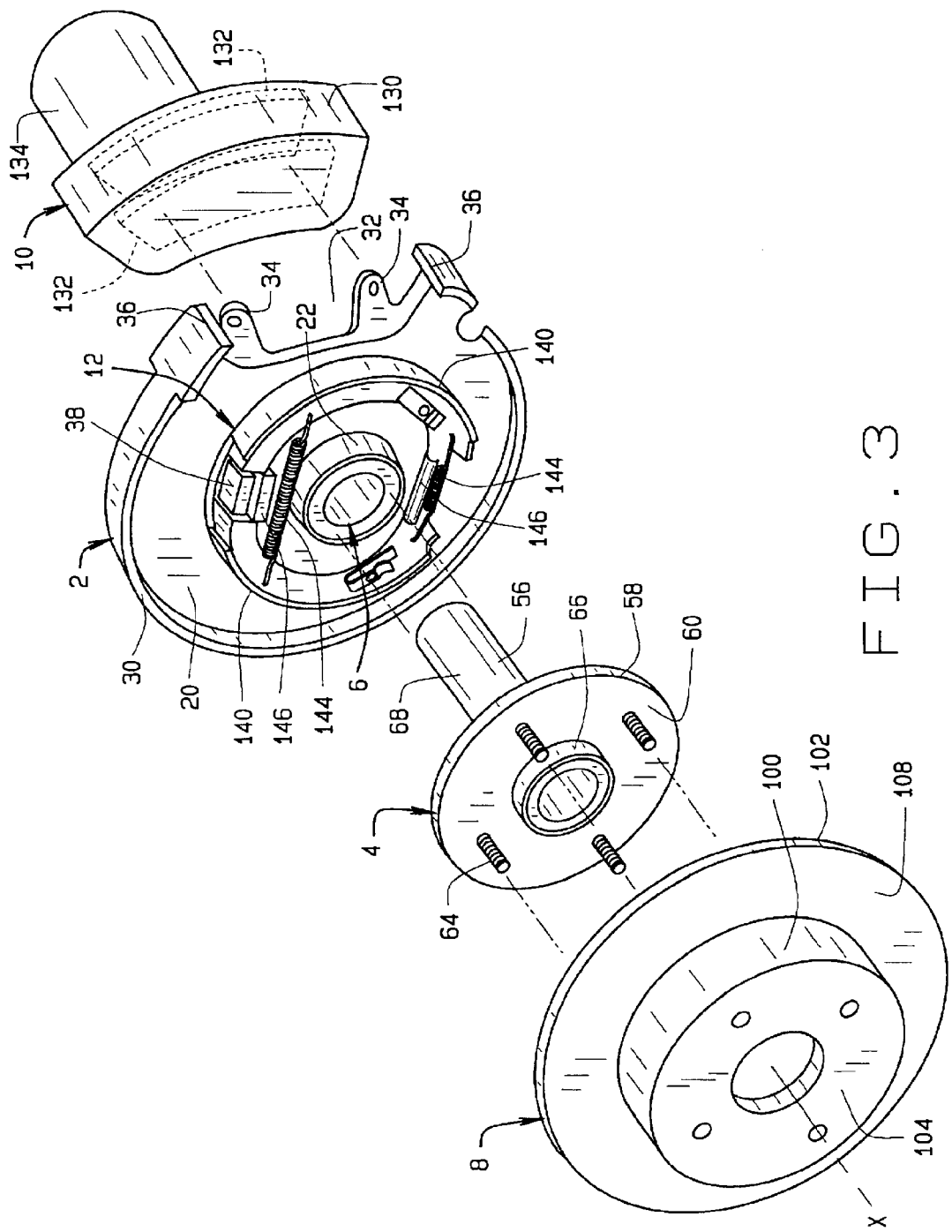
FIG. 3 is an exploded perspective view of the mounting.

Referring now to the drawings, a wheel mounting A (FIG. 1) for an independently suspended road wheel B of an automotive vehicle includes a housing 2 which may take the form of a suspension upright coupled to generally horizontal linkages that are spaced vertically or perhaps to a lower link and a shock absorber (McPherson strut). In addition, the mounting A includes a hub 4 to which the road wheel B is attached and a bearing 6 located between the housing 2 and the hub 4 to enable the hub 4 to rotate about an axis X with minimal friction. The mounting A further includes a brake rotor 8 which is carried by the hub 4 along with the wheel B, a service brake 10 mounted on the housing 2 externally of the rotor 8 to clamp against the rotor 8 and retard its rotation, and a park brake 12 (FIG. 3) that is mounted on the housing 2 within the rotor 8 to expand against the rotor 8 and prevent it from rotating.

Considering the housing 2 first, it includes (FIGS. 2 & 3) a plate-like radial portion 20 and a sleeve-like axial portion 22, the latter projecting both forwardly and rearwardly from the radial portion 20 at the center of the radial portion 20. The radial and axial portions 20 and 22 are formed integral preferably as a single casting, and thereafter are machined along surfaces against which the bearing 6 and the service brake 10 and park brake 12 are located. The radial portion 20 is coupled to the components of an automotive suspension system such as a pair of horizontal links or a horizontal link and a shock absorber, and with regard to the links, the coupling is such that the links pivot with respect to the housing 2.

The radial portion 20 of the housing 2 has a front face 26 which is presented outwardly away from the suspension system of the vehicle and a back face 28 which is presented inwardly. Thus, the front face 26 is the outboard face and the back face 28 is the inboard face. Along its periphery, the radial portion 20 has an axially directed lip 30 which projects forwardly, but the lip 30 does not close upon itself. Instead, it is interrupted by a cutout 32 in the radial portion 20, which cutout 32 extends into the radial portion 20 where it approaches the park brake 12. The radial portion 20, on its back face, has lugs 34 which lie behind the cutout 32. It also has backing ribs 36 which project forwardly and rearwardly from the back face 28 at the ends of the cutout 32. Both the lugs 34 and the ribs 36 are formed integral with the radial portion 20. On its front face 26 the radial portion 20 has a brake post 38 which is also formed integral with the portion 20 and serves as an anchor for the park brake 12.

The axial portion 22 of the housing 2 possesses a generally cylindrical configuration and projects from both the front face 26 and the back face 28 of the radial portion 20. At each of its ends, the axial portion 22 has a bore 44 that leads up to a shoulder 46, there being between the two shoulders 46 an intervening surface 48. The bores 44 at their opposite ends open into counterbores 50 which in turn open out of the ends of the axial portion 22.

The hub 4 includes (FIG. 2) a spindle 56 which projects into the axial portion 22 of the housing 2 and a flange 58 at one end of the axial portion 22 where it projects radially beyond the outboard end of the axial portion 22 and is offset from the front face 26 of the radial portion 20. The flange 58 has a front face 60 which is machined perpendicular to axis X and is presented away from radial portion 20. It carries several threaded studs 62 which extend axially through it and project beyond its front face 60 where lug nuts 64 are threaded over them. In addition to the spindle 56 and flange 58, the hub 4 has a wheel pilot 66 which projects forwardly beyond the front face 60 of the flange 58. The spindle 56, which is actually a stub shaft, provides a cylindrical bearing seat 68 which lies between a shoulder 70 located along the flange 58 and a formed end 72. Both the shoulder 70 and the formed end 72 form abutments for confining the bearing 6 to the spindle 56.

The bearing 6 (FIG. 2) includes an inner race in the form of two cones 80 located around the spindle 58, an outer race in the form of cups 82 located in the axial portion 22 of the housing 2 and surrounding the cones 80 and rolling elements in the form of tapered rollers 84 arranged in two rows, there being one row between the inboard cone 80 and cup 82 and another row between the outboard cone 80 and cup 82.

Each cone 80 has a tapered inner raceway 86 and a thrust rib 88 at the large end of the raceway 86. The rib 88 leads out to a back face 90. The two cones 80 fit over the bearing seat 68 of the spindle 56 with an interference fit. The inboard 80 cone has its back face 90 against the formed end 72 on the spindle 22, whereas the outboard cone 80 has its back face 90 against the shoulder 70 that is at the hub flange 58. One of the cones 80 has an extension 92 which projects beyond the small end of its raceway 86, and along the extension 92 that cone 80 abuts the other cone 80. The intervening surface 48 of the axial portion 22 surrounds the extension 92.

Each cup 82 has (FIG. 2) a tapered outer raceway 94 and a back face 96 at the small end of its raceway 94. The cups 82 fit into the bores 44 of the axial portion 22 with an interference fit and with their back faces 96 against the shoulders 46 at the ends of the bores 44. The tapered raceway 96 on the inboard cup 82 is inclined in the same direction as the tapered raceway 86 on the inboard cone 80 and is presented toward that raceway 86. The tapered raceway 94 on the outboard cup 82 is inclined in the same direction as the tapered raceway 86 of the outboard cone 80, and is presented toward that raceway 86. However, the inboard raceways 86 and 94 and the outboard raceways 86 and 94 are inclined in the opposite directions.

The tapered rollers 84 are arranged in two rows between the raceways 86 and 94—an inboard row between the inboard raceways 86 and 94 and an outboard row between the outboard raceways 86 and 94. The tapered side faces of the rollers 84 contact the tapered raceways 86 and 94, while the large end faces bear against the thrust ribs 88. The pairs of raceways 86 and 94 are oriented such that the small ends of the rollers 84 in the two rows are presented toward each other. Moreover, the rollers 84 of each row are on apex, meaning that the conical envelopes formed by the side face of each roller 84 for a row, and the conical envelopes for the raceways 86 and 94 of that row as well, have their apices at a common point along the axis X. Furthermore, the bearing 6 is preferably in a condition of preload, so no axial or radial clearances exist between the raceways 86 and 94 and the rollers 84.

Initially, the cylindrical bearing seat 68 extends out to the inboard end of the spindle 56 so that the bearing 6 and the housing 2 can be installed over the spindle 22. But once the bearing 6 is in place, the end of the spindle 56 is upset to provide the formed end 72. International Application PCT GB 98/01823, published under No. WO 98/58762, discloses a rotary forming process for upsetting the initially extended end of the spindle 56 and converting it into the formed end 72 which serves as an abutment for the inboard cone 80 of the bearing 6. Other types of abutments may be substituted for the formed end 72. For example, a nut may be threaded over the end of the spindle 56 or a snap ring engaged with the spindle 56.

The counterbores 50 of the axial portion 22 contain seals 98 which establish fluid barriers around the thrust ribs 88 of the two cones 80.

The brake rotor 8 includes (FIGS. 2 & 3) a drum 100 and a disk 102 projecting radially from the drum 100. At its end, the drum 100 has an end wall 104 that bears against the front face 60 of the flange 58 for the hub 4, it being held firmly against the flange 58 along with the wheel B by the lug nuts 64 which thread over the studs 62. The drum 100 has a cylindrical friction surface 106 which is presented inwardly toward and is parallel to the axis X. The disk 102 revolves opposite the front face 26 of the radial portion 20 for the housing 2 and has planar friction surfaces 108 which lie perpendicular to the axis X.

The inboard cone 80 of the bearing 6 has (FIG. 2) a target wheel 114 fitted over its cone extension 92 with an interference fit. The target wheel 114 includes teeth 116 arranged at equal and closely spaced circumferential intervals around its periphery. The teeth are presented toward the inboard region of the intervening surface 48 in the axial portion 22 of the housing 2. Here an oblique bore 118 opens into the axial portion 22, its opposite end being on the outer surface of the axial portion 22 adjacent to the back face 28 of the radial portion 20. The oblique bore 118 contains a sensor 120 having its inner end presented toward and in close proximity to the teeth 116 on the target wheel 114. The sensor 120 detects the rotation of the target wheel 114 and produces an electrical signal which reflects the angular velocity of the hub 4, and that signal is transmitted through a cable 122 that emerges from the outer end of the sensor 120.

The service brake 10 includes (FIG. 3) a caliper assembly 130 which fits into the cutout 32 of the radial portion 20 of the housing 2 between the ribs 36 at each end of the cutout 32 and is fastened to the lugs 34 on the radial portion 20. The caliper assembly 130 includes brake pads 132 which are presented opposite the two planar friction surfaces 108 on the disk 102 of the brake rotor 8. In addition, the service brake 10 includes an actuator 134 which is mounted on the caliper assembly 130 and urges the pads 132 together. Normally, the pads 132 are urged apart so that the disk 108 rotates between the pads 132 without the pads 132 contacting the friction surfaces 102. However, when activated, the actuator 134 urges the pads 132 together, causing them to clamp down on the planar friction surfaces 108 of the disk 102 and retard rotation of the brake rotor 8—and the hub 4 and road wheel B as well.

The park brake 12 includes (FIGS. 2 & 3) a pair of brake shoes 140 of arcuate configuration which are located within the confines of the drum 100 for the brake rotor 8. As such they are located along the front face 26 of the plate 20 and generally around the outboard portion of the housing 22. They generally follow the contour of the cylindrical friction surface 106 on the drum 100 and are presented toward the friction surface 106. Each shoe 140 has one of its ends against the brake post 38 that projects beyond the front face 26 of the plate 20. The opposite ends of the shoes 140 are connected by an adjustable spacer 142. The two shoes 140 are urged together by springs 144 which further urge the ends of the shoes 140 against the post 38 and the spacer 142. The shoes 140 more or less float on the post 38 in a contracted condition slightly removed from the cylindrical friction surface 106 on the drum 100. Finally, the park brake 12 includes an actuator 146 which urges the shoes 140 apart against the bias of the springs 144, so that they bear against the friction surface 106 of the drum 100 and prevent rotation of the hub 4 and road wheel B. In lieu of two brake shoes 140, a single brake shoe may be employed with its ends separated by an actuator that is mounted on the housing 2.

Since the axial and radial portions 20 and 22 of the housing 2 are cast integral, the housing 2 is not encumbered with the type of flange found on the housings of conventional wheel mountings, that is to say the need for a flange to secure the bearing assembly to a suspension upright is eliminated. The absence of that flange leaves more room for components of the park brake 12 and further permits the axial portion 22 to assume a size somewhat larger than the housings of typical wheel mountings. Of course, the enlarged axial portion 22 enables the bearing 6 to be of a size greater than the bearings of conventional wheel mountings as well. Finally, the integration of the axial portion 22 and the radial portion 20 leaves more space for the speed sensor 120, and permits the wire to come out of the housing 22 on the inboard side of the plate 28 where it does not interfere with the park brake 12.

Figure 4:
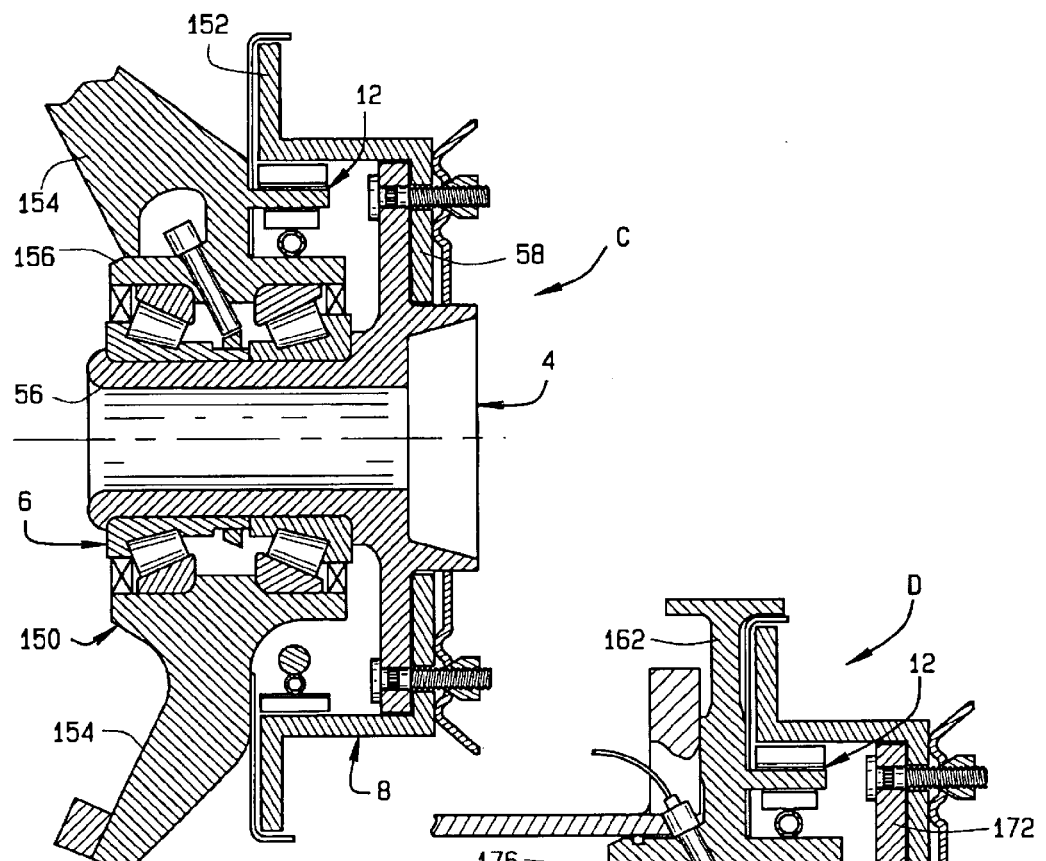
FIG. 4 is a sectional view of a modified wheel mounting.

A modified wheel assembly C (FIG. 4) is quite similar to the wheel mounting A, but has a housing 150 which differs in some respects from the housing 2 of the mounting A. Otherwise, the wheel mounting C is essentially the same as the mounting A. More specifically, the housing 150 takes the form of a steering knuckle and as such includes, in addition the radial portion 152, upper and lower arms 154 along which the entire housing 150 can pivot. The housing 150 also has an axial portion 156 which projects both forwardly from the radial portion 152 and rearwardly as well. The radial portion 152, the arms 154 and the axial portion 156 are all formed integral, preferably as a casting.

Figure 2:
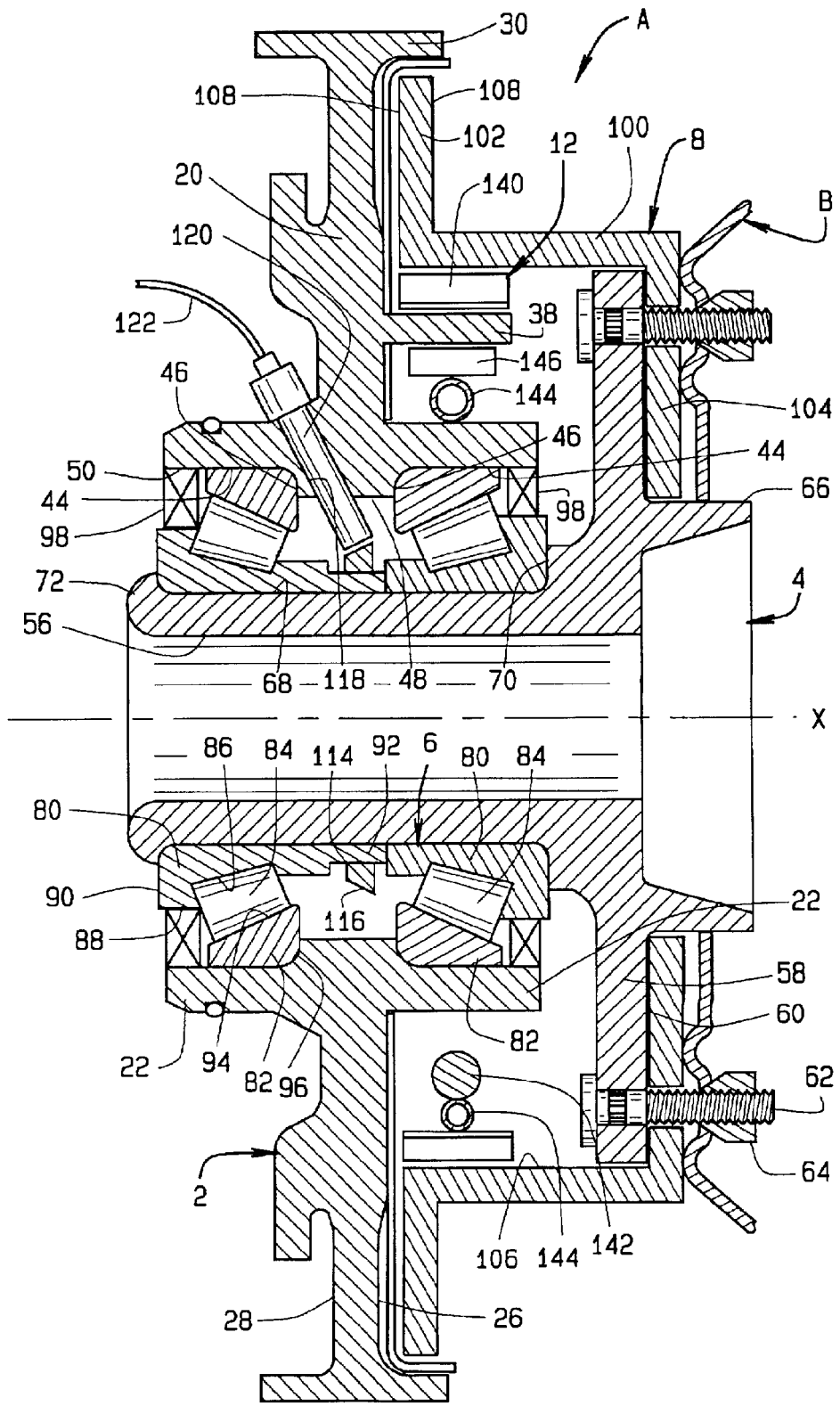
FIG. 2 is a sectional view of the mounting taken along line 2—2 of FIG. 1.
Figure 5:
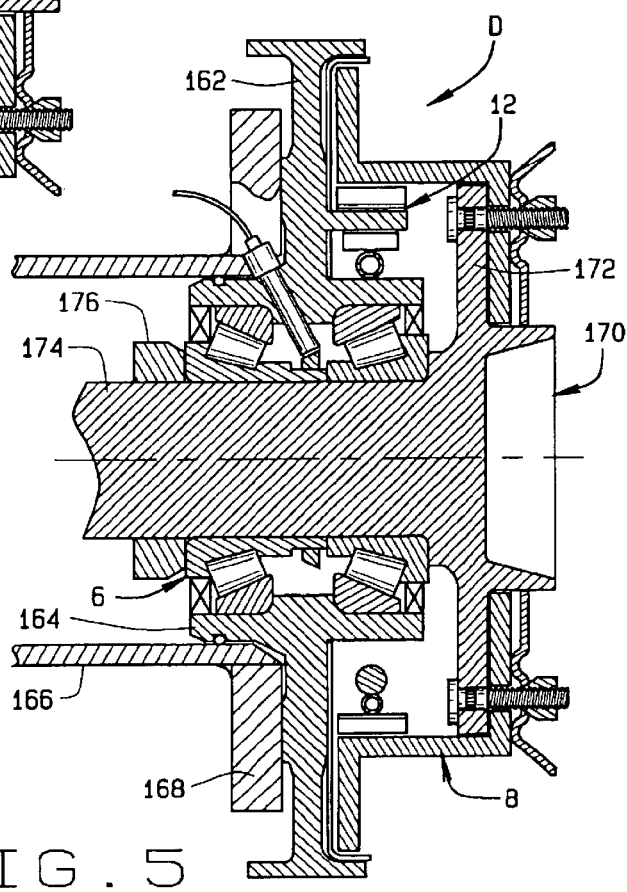
FIG. 5 is a sectional view of another modified wheel mounting.
Figure 6:
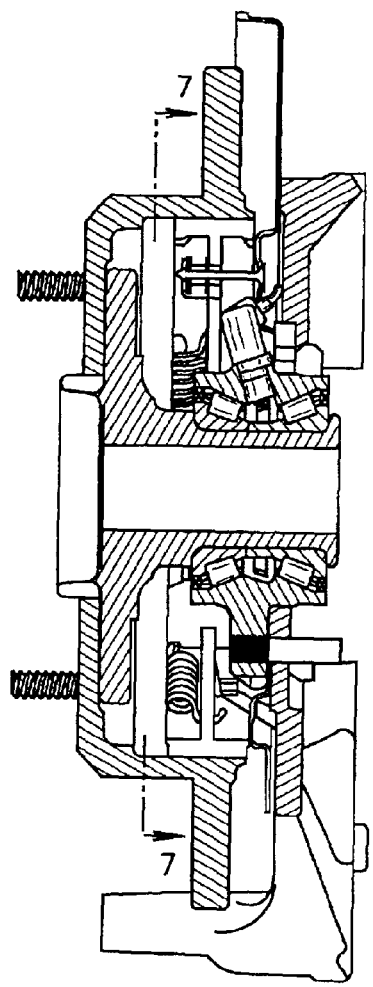
FIG. 6 is a sectional view of a wheel mounting of the prior art.
Figure 7:
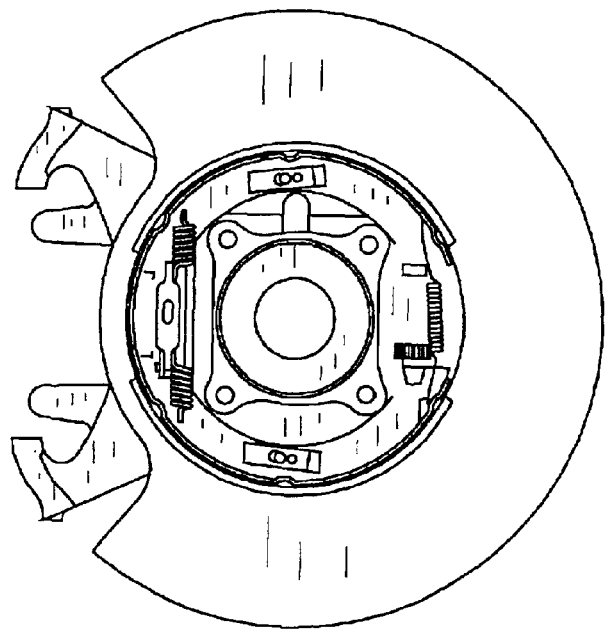
FIG. 7 is a sectional view taken along line 7—7 of FIG. 6.

Another modified wheel mounting D (FIG. 5) has a housing 160 which is in many respects similar to the housing 2 of the mounting A. As such it includes a radial portion 162 and an axial portion 164, but the housing 2 has an axle tube 166 bolted to it along a flange 168 at the end of the tube 164. The mounting D also has a hub 170 which differs somewhat from the hub 4 of the mounting A. The hub 170 has a flange 172 to which the brake rotor 8 and the road wheel B is attached and also an axle shaft 174 extended from the flange 172, and through the bearing 6, but the shaft 174 is considerably longer than the spindle 56 (FIG. 2). Indeed it passes through the axle tube 166, beyond which it is coupled to a differential for transferring torque to the hub 170. The shaft 174 is fitted with a collar 176 which retains the bearing 6 on the shaft 174.

Variations are possible. For example, the two cups 82 may be united into a single double cup fitted into the housing 22. Also, the cups 82 themselves may be integrated into the housing 22, so that the outer raceways 94 are machined surfaces on the housing 22 itself. Then again, the outboard cone 80 may be integrated into the spindle 56 of the hub 4, so that the outboard raceway 86 is a machined surface on the spindle 56. Moreover, a double row angular contact ball bearing may be substituted for the tapered roller bearing 6.

Furthermore, the spindles 56 for the hubs 4 of the mounting A and C within their interiors may be provided with splines for coupling them to CV joints which are in turn coupled to axle shafts so as to transfer torque to the hubs 4. The housing housings 2, 150 and 160 may be forgings instead of castings or even weldments.

| WHEEL MOUNTING WITH PARK BRAKE | |
|---|---|
| A | wheel mounting |
| B | road wheel |
| C | modified wheel mounting |
| D | modified wheel mounting |
| X | axis |
| 2 | housing |
| 4 | hub |
| 6 | bearing |
| 8 | rotor |
| 10 | brake (service) |
| 12 | brake (park) |
| 20 | radial portion |
| 22 | axial portion |
| 26 | front face |
| 28 | back face |
| 30 | lip |
| 32 | cutout |
| 34 | lugs |
| 36 | ribs |
| 38 | brake post |
| 44 | bore |
| 46 | shoulder |
| 48 | intervening surface |
| 50 | counterbores |
| 56 | spindle |
| 58 | flange |
| 60 | front face |
| 62 | threaded studs |
| 64 | lug nuts |
| 66 | pilot |
| 68 | bearing seat |
| 70 | shoulder |
| 72 | formed end |
| 80 | cone |
| 82 | cup |
| 84 | tapered rollers |
| 86 | tapered raceway |
| 88 | thrust rib |
| 90 | back face |
| 92 | cone extension |
| 94 | tapered raceway |
| 96 | back face |
| 98 | seals |
| 100 | drum |
| 102 | disk |
| 104 | annular wall |
| 106 | cylindrical friction surface |
| 108 | planar friction surfaces |
| 114 | target wheel |
| 116 | teeth |
| 118 | oblique bore |
| 120 | sensor |
| 122 | cable |
| 130 | caliper assembly |
| 132 | pads |
| 134 | actuator |
| 140 | brake shoes |
| 142 | spacer |
| 144 | springs |
| 146 | actuator |
| 150 | housing |
| 152 | radial portion |
| 154 | arms |
| 156 | axial portion |
| 160 | housing |
| 162 | radial portion |
| 164 | axial portion |
| 166 | axle tube |
| 168 | flange |

-continued

WHEEL MOUNTING WITH PARK BRAKE

| 170 | hub |
| 172 | flange |
| 174 | axle shaft |

What is claimed is:

1. A mounting for a mad wheel of an automotive vehicle, said mounting comprising:
   a cast housing having a radial portion provided with front and back faces and a sleeve-like axial portion cast integral with the radial portion and projecting from both the front and back faces of the radial portion the radial portion of the housing having a cutout located outwardly from the radial portion and lugs located at the cutout, the radial portion also having a post which projects from its front face;
   a hub having a shaft in the axial portion of the housing and a flange attached to the shaft and located outside the housing where it is spaced from the front face of the radial portion; and
   a bearing located between the shaft of the hub and the axial portion of the housing.

2. A mounting according to claim 1 wherein the bearing includes inboard and outboard outer raceways carried by the axial portion of the housing, inboard and outboard inner raceways carried by the shaft of the hub, the raceways being inclined with respect to the axis, with the inboard raceways being inclined in one direction and the outboard raceways being inclined in the opposite direction, and rolling elements arranged in inboard and outboard rows, with the rolling elements of the inboard row being between the inboard raceways and the rolling elements of the outboard row being between the outboard raceways.

3. A mounting according to claim 2 and further comprising a target wheel carried by the shaft of the hub and a sensor in the axial portion of the housing and presented toward the target wheel for producing a signal that reflects the angular velocity of the target wheel.

4. A mounting according to claim 1 and further comprising an arcuate brake shoe mounted along the front face of the radial portion and radially outwardly from the segment of the axial portion that projects beyond the front face, the brake shoe being positioned by the post on the radial portion of the housing and being capable of moving radially outwardly.

5. A bearing according to claim 4 and further comprising a brake rotor mounted on the flange of the hub and having a drum located around the arcuate brake shoe.

6. A bearing according to claim 5 wherein the brake rotor further has a disk which extends radially outwardly from the drum along the front face of the radial portion for the housing.

7. A mounting according to claim 6 and further comprising a service brake mounted in the cutout in the radial portion of the housing and being attached to the lugs on the radial portion, the service brake having pads between which the disk of the brake rotor revolves.

8. A mounting according to claim 1 wherein the housing has arms formed integral with its radial portion so that the housing serves as a steering knuckle.

9. A mounting according to claim 1 wherein the housing is attached to an axle tube and the shaft of the hub extends through the tube.

10. A mounting for the road wheel of an automotive vehicle, said mounting comprising:
   a housing including a radial portion having front and back faces and an axial portion formed integral with the radial portion and projecting beyond the front and back faces of the radial portion;
   a hub having a shaft that extends into the axial portion of the housing, the hub also having a flange which projects outwardly from the shaft and is spaced from the front face of the radial portion of the housing;
   a bearing located in the axial portion of the housing and around the shaft of the hub so the hub can rotate in the housing about an axis, the bearing including inboard and outboard outer raceways carried by the axial portion of the housing, inboard and outboard inner raceways carried by the shaft of the hub, the raceways being inclined with respect to the axis, with the inner raceways being inclined in one direction and the outboard raceways being inclined in the opposite direction, and rolling elements arranged in inboard and outboard rows, with the rolling elements of the inboard row being between the inboard raceways and the rolling elements of the outboard row being between the outboard raceways;
   a target wheel carried by the shaft of the hub between the inner raceways of the bearing;
   a sensor located in the housing and presented toward the target wheel for producing a signal that reflects the angular velocity of the target wheel, the sensor being accessible at the back face of the radial portion of the housing;
   a brake rotor attached to the flange of the hub and having a drum which surrounds the axial portion of the housing and a disk which is located along the radial portion;
   a service brake mounted on the radial portion of the housing and having a caliper; and
   a park brake mounted on the housing within the drum and having a shoe.

11. A mounting for a road wheel of an automotive vehicle, said mounting comprising:
   a housing having a radial portion provided with front and back faces and a sleeve-like axial portion cast integral with the radial portion and projecting from both the front and back faces of the radial portion;
   a hub having a shaft in the axial portion of the housing and a flange attached to the shaft and located outside the housing where it is spaced from the front face of the radial portion;
   a bearing between the shaft of the hub and the axial portion of the housing, the bearing including inboard and outboard outer raceways carried by the axial portion of the housing, inboard and outboard inner raceways carried by the shaft of the hub, the raceways being inclined with respect to the axis, with the inboard raceways being inclined in one direction and the outboard raceways being inclined in the opposite direction, and rolling elements arranged in inboard and outboard rows, with the rolling elements of the inboard row being between the inboard raceways and the rolling elements of the outboard row being between the outboard raceways;
   a target wheel carried by the shaft of the hub and located between the inner raceways of the bearing;
   a sensor in the axial portion of the housing and presented toward the target wheel for producing a signal that reflects the angular velocity of the target wheel; and
   a cable extending from the sensor at the back face of the radial portion on the housing.

12. A mounting for a road wheel of an automotive vehicle, said mounting comprising:

a housing having a radial portion provided with front and back faces and a sleeve-like axial portion formed integral with the radial portion and projecting from at least the front face of the radial portion, the radial portion being provided with first elements for securing a service brake to the housing outwardly from the axial portion and a second element on its front face for positioning a park brake on the housing opposite the front face and generally around the axial portion;

a hub having a shaft in the axial portion of the housing and a flange attached to the shaft and located outside the housing where it is spaced from the front face of the radial portion; and a bearing located between the shaft of the hub and the axial portion of the housing for enabling the hub to rotate with respect to the housing about an axis of rotation.

13. A mounting according to claim 12 and further comprising a service brake secured to the housing at the first elements on the radial portion of the housing.

14. A mounting according to claim 13 and further comprising a park brake located along the front face of the radial portion on the housing and around the axial portion of the housing, the park brake being positioned by the second element on the housing.

15. A mounting according to claim 13 wherein the axial portion of the housing also projects from the back face of the radial portion.

16. A mounting according to claim 15 wherein the radial portion of the housing contains a cutout located outwardly from the axial portion, and the service brake is in the cutout.

17. A mounting according to claim 16 wherein the radial portion of the housing along the front face of the radial portion carries a mechanism for urging a brake shoe against a drum of a brake rotor.

18. A mounting according to claim 15 wherein the bearing includes inboard and outboard outer raceways carried by the axial portion of the housing, inboard and outboard inner raceways carried by the shaft of the hub, the raceways being inclined with respect to the axis, with the inner raceways being inclined in one direction and the outboard raceways being inclined in the opposite direction, and rolling elements arranged in inboard and outboard rows, with the rolling elements of the inboard row being between the inboard raceways and the rolling elements of the outboard row being between the outboard raceways.

19. A mounting according to claim 18 and further comprising a target wheel carried by the shaft of the hub and a sensor in the housing and presented toward the target wheel for producing a signal that reflects the angular velocity of the target wheel.

20. A mounting according to claim 12 wherein the housing is a casting.

21. A mounting according to claim 12 wherein the housing is weldment.

\* \* \* \* \*

UNITED STATES PATENT AND TRADEMARK OFFICE
CERTIFICATE OF CORRECTION

PATENT NO. : 6,811,003 B2
DATED : November 2, 2004
INVENTOR(S) : David A. Novak

It is certified that error appears in the above-identified patent and that said Letters Patent is hereby corrected as shown below:

Title page,
Item [73], Assignee, replace "Tinken" with -- Timken --.

Column 7,
Line 10, under "What is claimed is":
replace "mad" with -- road --

Signed and Sealed this

Third Day of May, 2005

JON W. DUDAS
*Director of the United States Patent and Trademark Office*